Patented July 2, 1940

2,206,603

UNITED STATES PATENT OFFICE 2,206,603

PRODUCTION OF AMINOTRIAZINES

George H. Foster, Stamford, Conn., assignor to American Cyanamid Company, New York, N. Y., a corporation of Maine No Drawing. Application October 28, 1939, Serial No. 301,755

4 Claims. (Cl. 260—248)

This invention relates to the production of aminotriazines such as melamine, ammeline, ammelide and the like, by heating dicyandiamide in the presence of a liquid heating medium. Objects of the invention are to provide a method of preparing aminotriazines at materially lower temperatures than those which have hitherto been used.

I have found that when dicyandiamide is heated in liquid heating media, in the presence of zinc chloride, good yields of aminotriazines are obtained even when the heating is carried out at relatively low temperatures such as 100–130° C. This enables the use of such cheap solvents as ethyl alcohol, ethylene glycol, or even water without the necessity of employing autoclaves or other pressure vessels. It also permits the heating medium to be easily separated from the aminotriazine product by distillation or evaporation.

The amounts of zinc chloride to be used may vary throughout a relatively wide range depending upon the type of heating medium, the temperature, and the particular aminotriazine to be produced. In general, quantities of from 3% to 30% of zinc chloride, based on the weight of the dicyandiamide, may be employed. In the production of hydroxy aminothiazines such as ammeline and ammelide it is preferable to use smaller quantities of zinc chloride such as 4–8%, based on the weight of the dicyandiamide. In the preparation of melamine and when employing alcoholic heating media such as ethyl alcohol, ethylene glycol, and the like, quantities of zinc chloride ranging from 15% to 30% of the dicyandiamide may be employed.

Upon completion of the reaction the zinc chloride catalyst is easily removed from the reaction product by leaching with water or dilute hydrochloric acid. Such solutions, being acidic in nature, form a ready means for the removal of impurities from melamine, ammeline and ammelide, none of which are soluble in dilute acids.

The invention will be illustrated in greater detail by the following specific examples. It is understood, however, that although these examples may describe some of the more limited features of the invention, they are given primarily for purposes of illustration and the invention in its broader aspects is not limited thereto.

Example 1

25 parts by weight of zinc chloride were dissolved in 500 parts by weight of ethylene glycol and the mixture was heated to 100° C. 440 parts of dicyandiamide were then slowly added with stirring and the heating was continued at 100–110° C. for 2½ hours, after which time a thick mass of crystals had formed and the mixture was almost solid. When a sample was added to alcoholic picric acid a picrate was formed which dissolved upon heating and recrystallized in long needles characteristic of melamine picrate.

The material was then slurried up with 200 parts of water and filtered. The filter cake was suspended in 1000 parts of water, heated to 90–95° C. and filtered hot. Upon cooling the filtrate a large mass of crystals was obtained which were filtered off. The original filter cake was again extracted with hot water and a second crop of crystals obtained which were added to the first. The total yield was 35%, based on the dicyandiamide used.

Example 2

100 parts of dicyandiamide, 200 parts of water and 4 parts of zinc chloride were heated to boiling and refluxed for two hours. At the end of this period a white, insoluble precipitate was obtained which was filtered off and a sample tested with picric acid solution. Fine, needle-like picrate crystals were obtained. The product was insoluble in water but soluble in alkalies and was therefore identified as a mixture of ammeline and ammelide.

What I claim is:

1. A method of promoting the decomposition of dicyandiamide which comprises heating it in a liquid heating medium in the presence of zinc chloride.

2. A method of promoting the decomposition of dicyandiamide and the formation of triazines therefrom which comprises heating dicyandiamide in a non-aqueous liquid heating medium in the presence of zinc chloride.

3. A method of promoting the decomposition of dicyandiamide and the formation of aminotriazines therefrom which comprises heating dicyandiamide in a liquid heating medium at temperatures of 100–130° C. in the presence of zinc chloride.

4. A method of promoting the decomposition of dicyandiamide and the formation of melamine therefrom which comprises heating dicyandiamide in ethylene glycol at 100–130° C. in the presence of zinc chloride.

GEORGE H. FOSTER.